Jan. 8, 1935. T. STENHOUSE ET AL 1,987,249
GLASS SEVERING MECHANISM
Filed Feb. 5, 1930   3 Sheets-Sheet 1

Inventors
Thomas Stenhouse
David Stenhouse
By Eccleston & Eccleston
Attorneys

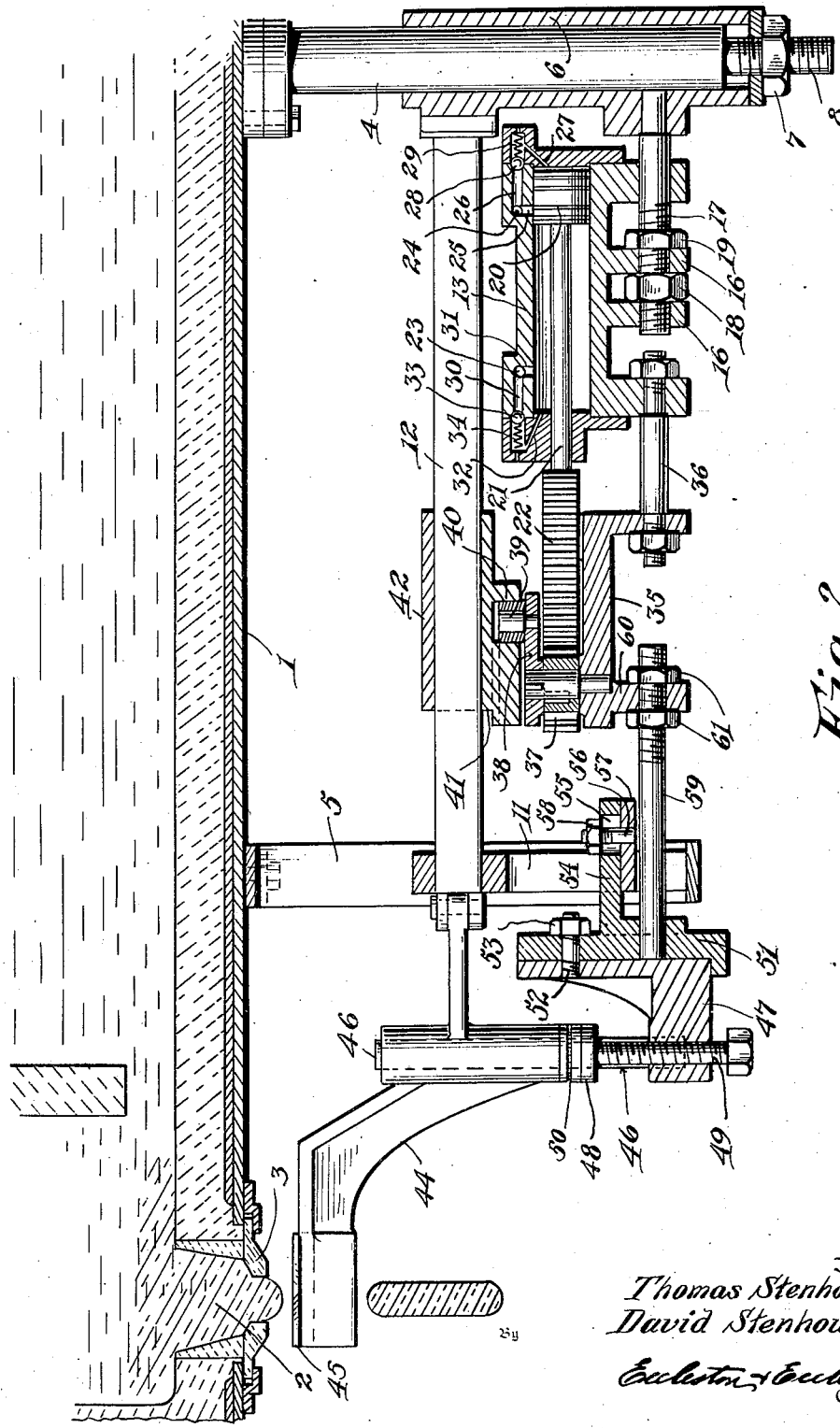

Jan. 8, 1935.  T. STENHOUSE ET AL  1,987,249
GLASS SEVERING MECHANISM
Filed Feb. 5, 1930  3 Sheets-Sheet 3
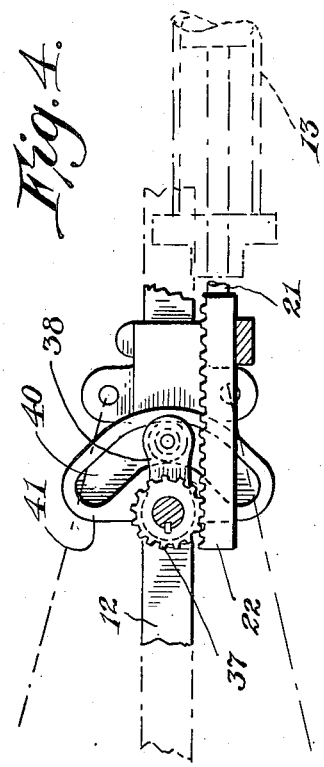
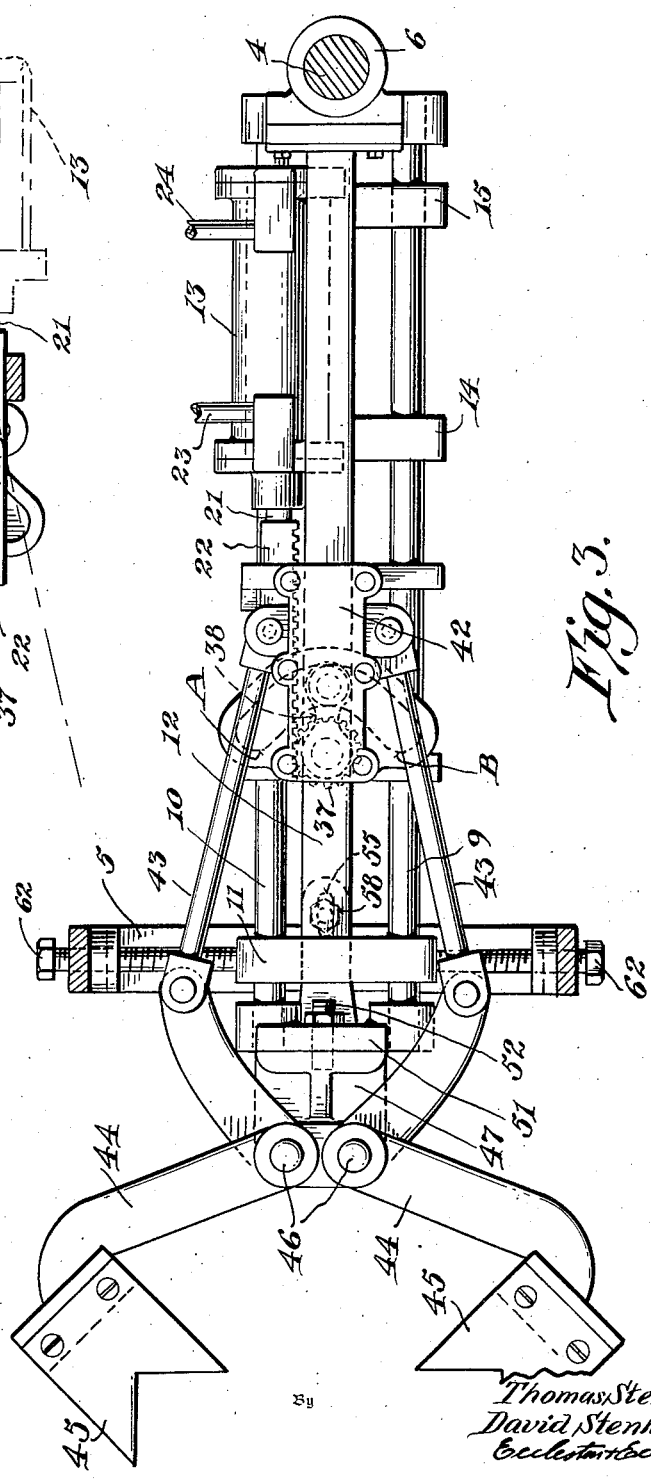
Inventors
Thomas Stenhouse
David Stenhouse
By Eccleston & Eccleston
Attorneys Patented Jan. 8, 1935

1,987,249

UNITED STATES PATENT OFFICE 1,987,249

GLASS SEVERING MECHANISM

Thomas Stenhouse and David Stenhouse, Washington, Pa., assignors to Hazel-Atlas Glass Co., Wheeling, W. Va., a corporation of West Virginia Application February 5, 1930, Serial No. 426,083

5 Claims. (Cl. 49—55)

The invention relates generally to improved shears for severing glass charges being fed to forming molds, and one of the objects of the invention is to provide a mechanism by which the glass is severed more quickly, thereby reducing or eliminating the shear mark, and otherwise improving the product. A further object of the invention is to provide shears that sever at such high speed that the charges are not deflected, thereby eliminating the use of the old and commonly used baffle plates.

Another object of the invention is to provide a shear mechanism in which the shears are traveling at their maximum speed during the severing operation; any cushioning effect not becoming active until after the severing operation has been completed.

Another object of the invention is to provide shears which will not only operate more efficiently than those previously known, but also which will be more economical in operation, particularly in the use of compressed air or other motive fluid.

A further object of the invention is to generally improve the construction, operation, and efficiency of cylinder operated shears.

Numerous advantages of the invention will be apparent to those skilled in the art, from the following detailed description, when taken in connection with the accompanying drawings; in which Figure 1 is a side elevational view of the device; parts being broken away to more clearly show the construction.

Figure 2 is a vertical longitudinal sectional view of the device.

Figure 3 is a plan view of the device; and

Figure 4 is a detail sectional view taken on line 4—4 of Figure 1, looking in the direction of the arrows.

Figure 1:
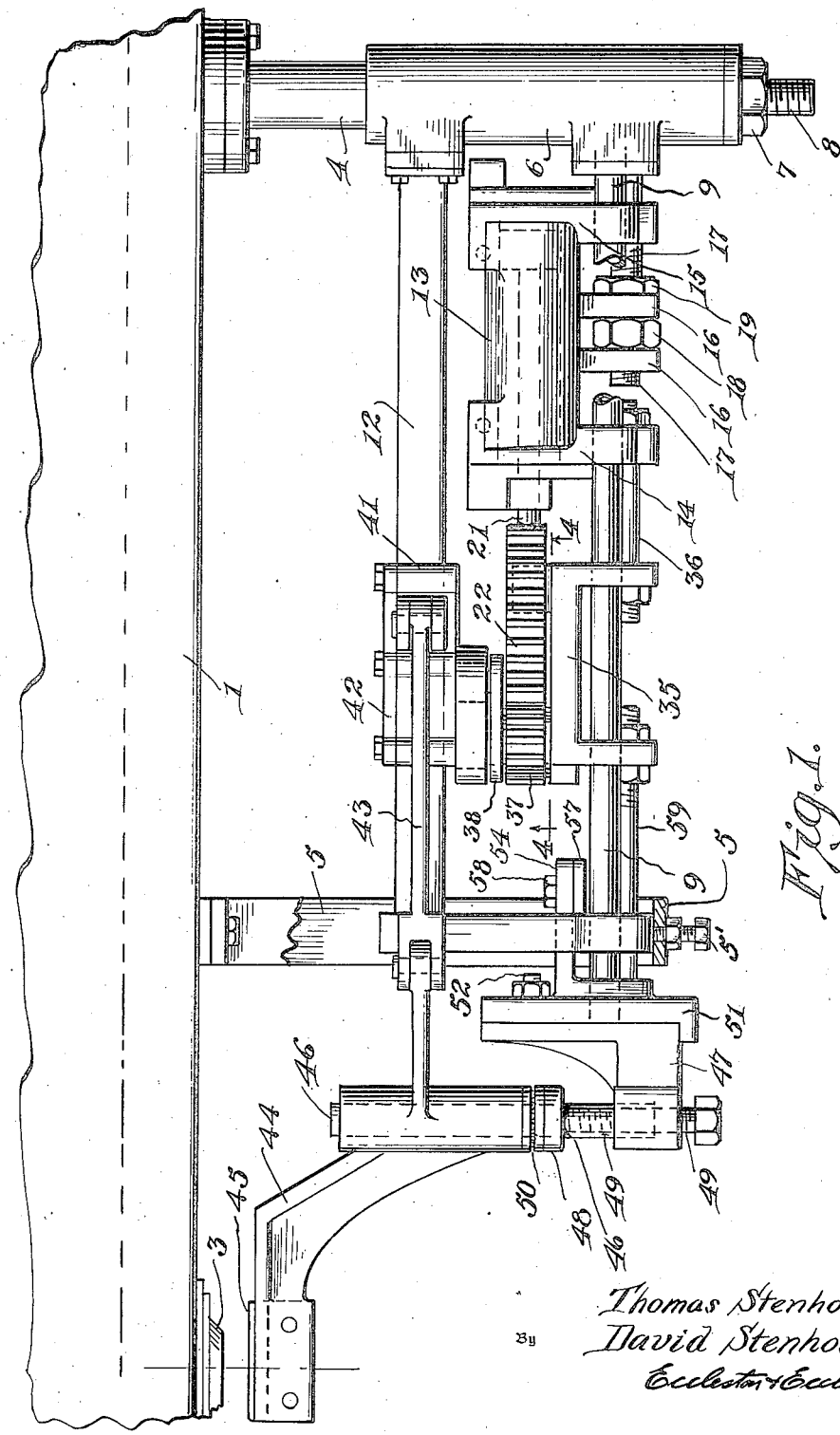

Referring to the drawings more in detail, numeral 1 indicates a glass flow spout of any desired construction, and having the conventional flow orifice 2 and removable bushing 3. The particular mode of feeding the glass does not enter into the present invention, and it will be understood that the feeding may be controlled by an ordinary reciprocating plunger, or by the ordinary pneumatic feeding devices, or by merely allowing the glass to flow through the orifice by gravity and severing charges of the desired sizes, or any other method of feeding glass may be employed. Accordingly, no particular feeding mechanism has been illustrated herein, other than the ordinary flow orifice through which the glass flows by gravity.

Numeral 4 indicates a column depending from the flow spout, and numeral 5 indicates a U-shaped bracket which is also attached to the flow spout. A bracket 6 is mounted on the column 4, and is adapted to be vertically adjusted by means of a nut 7 which is threaded onto a reduced portion 8 of the column 4. The bracket 6 is also angularly adjustable about the column, as will appear hereinafter.

Numerals 9 and 10 refer to two spaced parallel rods which have their rear ends secured in the bracket 6, and their forward ends secured in a frame member 11 mounted in the U-shaped bracket 5; the frame member being vertically adjustable in the bracket 5 by means of the screw 5'. Numeral 12 refers to a slide rod, which is similarly mounted, but which is arranged above the rods 9 and 10.

The rods 9 and 10 carry the shear operating cylinder 13 and other operating mechanism; the vertical position thereof being regulated by the aforementioned nut 7 and screw 5'. The cylinder is mounted on the rod 10 by means of depending lugs (not shown) and on the rod 9, by means of similar depending lugs 14 and 15. For the purpose of regulating the shears, it is desirable to have the cylinder adjustable in the direction of its length. For this purpose we provide the cylinder with a pair of spaced depending lugs 16, 16, which receive a short threaded rod 17, which is fixed to the bracket 6. A nut 18 is threaded on the rod 17, between the lugs 16, 16, and obviously the cylinder is adjusted either forward or backward, by turning the nut in the proper direction; the cylinder being secured in position by means of the lock nut 19.

The operating cylinder 13 is provided with a piston 20 and piston rod 21; the latter carrying the rack 22, for opening and closing the shears, in a manner to be hereinafter described. While we prefer to reciprocate the rack by a cylinder and piston, it is obvious that any other desired means may be employed for actuating the rack. Likewise, it should be stated that the specific construction of the cylinder per se forms no part of the present invention, and no claim thereto is made herein. The specific cylinder construction illustrated herein, and which we preferably employ, will now be described.

The usual pipes 23 and 24 lead to the cylinder 13, for alternately supplying pressure and exhausting opposite ends of the cylinder, to reciprocate the piston 20 and rack 22. These air lines 23 and 24 may or may not be furnished with the usual pressure or volume control valves, as desired. And, of course, any preferred form of the various old and well known timing devices, is employed to control the air lines. Such devices have been in common use for many years, and illustration is therefore unnecessary.

The pipe 24 leads to two passages 25 and 26, formed in the cylinder wall. The passage 25 enters the cylinder at a distance from the end thereof slightly less than the length of piston 20; while passage 26 leads to a passage 27, of reduced size, leading into the end of the cylinder. The passage 26 is provided with a check valve, consisting of ball 28 and spring 29.

The opposite end of the cylinder is of the same construction. The pipe 23 leads to the two passages 30 and 31; the latter passage leading directly into the cylinder at a distance from the end thereof less than the length of the piston. The passage 30 communicates with a reduced passage 32 leading into the end of the cylinder; and the passage 30 being provided with a suitable check valve, such as ball 33 and spring 34. The operation of this specific form of cylinder will now be briefly described.

Compressed air is admitted through pipe 24 to the passages 25 and 26. Entrance of the pressure directly into the cylinder by way of passage 25 is prevented, as such passage is shut off by the piston 20. The fluid pressure will therefore pass through passage 26, unseal the ball 28, and enter the end of the cylinder, in reduced volume, through the reduced passage 27. The admission of this reduced volume of fluid pressure is sufficient to start the movement of the piston, and as soon as the piston passes the passage 25, the fluid pressure will enter the cylinder in full force, through such passage. During the travel of the piston, there is a free exhaust of the opposite end of the cylinder through passage 31, but as the piston approaches this end of the cylinder, the passage 31 will be covered by the piston, thereby cutting off the exhaust therethrough, and providing a cushioning effect. A restricted exhaust of the air in the end of the cylinder, is then permitted through the small passage 32. The movement of the piston in the opposite direction is effected in the same manner as above described.

As we prefer to employ the specific cylinder construction illustrated, it is necessary that it be described in detail as above; but we desire to repeat that the invention is not limited to any particular cylinder, or to any other particular means for imparting the reciprocating motion, and the specific cylinder construction per se is not claimed.

Numeral 35 refers to a bracket which is mounted on the rods 9 and 10, and which is held in position by means of a short tie rod 36, having its ends secured to lugs depending from the bracket and from the cylinder. Any longitudinal adjustment of the cylinder, by means of the nut 18, will cause a similar adjustment in the position of the bracket 35.

Suitably mounted on the bracket 35 is a gear wheel 37, which meshes with the rack 22, and which is designed to make a complete revolution for each stroke of the piston. A crank arm 38 rotates with the gear wheel 37, and carries at its end a roller 39 which travels in a cam track 40, formed in the underside of a slide or carriage 41. This slide is mounted on the slide rod 12 by any desired means, such as by the cap 42; the slide rod being preferably square in cross-section. The action of the cam and associated parts, will be described in detail hereinafter; it being sufficient to state here that one stroke of the piston causes a complete rotation of the gear wheel, which in turn causes a complete forward and backward movement of the carriage or slide 41. And as this carriage is operatively connected with the shears, it follows that the shears will be closed and opened by one stroke of the piston. The operative connection between the slide and shears, and the mounting of the shears will now be described.

Connecting rods 43, 43, are pivotally attached at their rear ends to the slide or carriage 41, and their forward ends are pivotally attached to the usual bell crank levers 44, 44, which carry the ordinary V-notched shear blades 45, 45.

The bell crank levers are mounted on the hinge pins 46, 46, which are mounted in appropriate sockets formed in a bracket 47. The shear hinges rest upon a cross plate 48, which plate is vertically adjusted, to properly position the shears relative to the flow orifice, by means of a rod 49 which is threaded through the bracket 47 and engages the cross plate. Ball bearing races 50 are provided between the cross plate and the bases of the shear hinges.

The bracket 47 is attached to a bracket 51 by means of a stud bolt 52 and nut 53, thereby permitting a quick bodily removal and replacement of the shears. The bracket 51 is provided with a rearwardly extending lug 54, having an elongated slot 55, which receives a stud bolt 56 carried by a lug 57 formed on the frame member 11; the two lugs 54 and 57 being clamped together to hold the bracket 51 in adjusted position, by means of the nut 58 on stud bolt 56. A rod 59 is fixed to and extends rearwardly from the bracket 51; the rear portion of the rod passing through a lug 60 formed integral with bracket 35, and having nuts 61, 61, threaded on the rod on opposite sides of the lug. By the proper manipulation of these nuts 61, 61, after loosening the nut 58, the shears may be moved forward or backward to the desired extent. Rods 62, 62, are threaded through the U-shaped bracket 5, and have their inner ends engaging opposite sides of the frame member 11, so that by the proper manipulation of these screws 62, the shears will be moved laterally to the right or left; the entire mechanism turning about the column 4 as a pivot.

The various adjustments permit the shears to be adjusted to the right or left, backward or forward, up or down, and of course, to vary the overlap as desired. The manner of vertically adjusting the shears, and the manner of laterally adjusting them to the right or left, are obvious. The forward and backward adjustments, and the overlap adjustments may be made in various ways, depending upon the result desired. For instance, the nut 58 can be loosened, and the entire mechanism moved in either direction by the rotation of the nut 18. Or the two nuts 61 can be loosened, and the operating mechanism can be adjusted relative to the shears, in either direction. Or, the nut 58 can be loosened, and the shears can be adjusted relative to the operating mechanism by means of the nuts 61, 61. It is apparent, therefore, that the shearing mechanism possesses an unusually wide range of adjustments. The operation of the shears will now be described.

Assuming the shears are open, with the operating parts in the position shown in the drawings, air pressure will be admitted to the rear end of the cylinder, to force the plunger forward. As stated hereinbefore, the rack and gear are so designed that the gear makes one complete revolution for each stroke of the piston. As the plunger starts forward, the gear 37, crank arm 38 and roller 39, will be caused to rotate in an anticlockwise direction (Fig. 3). About the first quarter of the piston travel is relatively slow, and hence the first quarter turn of the crank arm is relatively slow, and due to the contour of the cam track the slide or carriage moves forward with a relatively slow movement. Thus the shears start to close with a rather gentle movement. But as the piston passes clear of the port 25, pressure enters the cylinder with full force, and just thereafter the roller 39 reaches the point indicated by "A" in Figure 3. While the roller is traveling from "A" to "B" the slide is moved forward and backward with great rapidity to close and open the shears. While the crank arm is making this movement, the piston is traveling at its greatest speed, having cleared the port 25; and it is to be particularly noted that the contour of the cam track from "A" to "B" is such as to greatly accelerate the closing and opening of the shears.

The crank arm has completed about three-quarters of its rotation, and the piston has completed about three-quarters of its stroke. During the remaining quarter stroke of the piston a slowing down or cushioning effect is produced by reason of the shutting off of the port 31, and thus the last quarter rotation of the crank arm is relatively slow, and the contour of the cam is such that the remaining backward movement of the slide will be relatively slow. Thus after the shears have been snapped shut and open with unusual speed, the remaining movement of the shears to full open position, which is reached when the piston reaches the end of its stroke, is relatively slow. All of the parts are now in exactly the same position that they started from, with the exception of the piston, which is now at the forward end of the cylinder. At the desired instant pressure will be admitted to the forward end of the cylinder to start the piston on its backward stroke, whereby the same severing operation will again be performed; the crank arm now traveling in a clockwise direction (Fig. 3).

It will be apparent that not only is the complete severing operation performed by one stroke of the piston instead of requiring two strokes as in prior severing mechanism, but also that the actual severing of the glass and the opening of the blades, occurs while the piston is traveling at its maximum speed, no cushioning effect of the plunger occurring until after the glass has been severed and the shears opened sufficiently to clear the oncoming glass. We have illustrated a specific cam construction and have indicated in some detail the sequence of events in the operation of the shear mechanism; but it will be understood that the invention is not limited to any specific cam, or in fact, to any cam at all, or to any particular sequence of events in the operation of the mechanism. The invention is subject to numerous changes and modifications, all of which we aim to include in the scope of the appended claims.

What we claim is:

1. Glass severing mechanism including shears, a reciprocable cam operatively connected with the shears, and a rotary element operatively engaging the cam, the contour of the cam being such that the shears will travel at a maximum speed while actually severing the glass.

2. Glass severing mechanism including shears, a reciprocable cam operatively connected with the shears, a rotary element operatively connected with the cam, the contour of the cam being such that it will be moved forward and backward to close and open the shears in one complete rotation of the rotary element, and the contour of the cam also being such that the shears will travel at a maximum speed during the actual severing of the glass.

3. Glass severing mechanism including shears, a cam operatively connected with the shears, the contour of the cam being such as to impart the maximum speed to the shears during the actual severing operation, an actuating member for the cam, and a cylinder and piston to operate the actuating member.

4. Glass severing mechanism including shears, a member reciprocable in a rectilinear path for operating said shears, said member closing and opening the shears during its continued rectilinear movement in one direction, and a cam between said member and the shears, said cam designed to cause the shears to travel at a maximum speed during the actual severing of the glass.

5. Glass severing mechanism including shears, a member reciprocable in a rectilinear path for operating said shears, said member closing and opening the shears during its continued rectilinear movement in one direction, a cam between said member and the shears, said cam designed to cause the shears to travel at a maximum speed during the actual severing of the glass, and a rotatable element operatively connected with the cam, said rotatable element being driven by said reciprocable member.

THOMAS STENHOUSE.
DAVID STENHOUSE.